US012463263B2

(12) United States Patent
Wegner et al.

(10) Patent No.: US 12,463,263 B2
(45) Date of Patent: Nov. 4, 2025

(54) X-RAY RADIOGRAPHS BASED FAULT DETECTION AND PREDICTION FOR BATTERY CELLS

(71) Applicant: GM GLOBAL TECHNOLOGY OPERATIONS LLC, Detroit, MI (US)

(72) Inventors: Diana M. Wegner, Bloomfield Hills, MI (US); Megan E. Mcgovern, Detroit, MI (US); Dmitriy Bruder, Clinton Township, MI (US); Sean Robert Wagner, Shelby Township, MI (US); Tanjina Ahmed, Warren, MI (US); Evan William Schmitz, Oxford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 571 days.

(21) Appl. No.: 17/948,841

(22) Filed: Sep. 20, 2022

(65) Prior Publication Data
US 2024/0097215 A1    Mar. 21, 2024

(51) Int. Cl.
*H01M 10/42* (2006.01)
*G01N 23/083* (2018.01)
*G01N 23/18* (2018.01)

(52) U.S. Cl.
CPC ...... *H01M 10/4285* (2013.01); *G01N 23/083* (2013.01); *G01N 23/18* (2013.01); *G01N 2223/1016* (2013.01); *G01N 2223/646* (2013.01)

(58) Field of Classification Search
CPC ................................................ H01M 10/4285
See application file for complete search history.

(56) References Cited

U.S. PATENT DOCUMENTS

| | | | |
|---|---|---|---|
| 6,480,002 B1 * | 11/2002 | Jung | H01M 10/0583 382/141 |
| 9,733,385 B2 * | 8/2017 | Franco | G01N 23/04 |
| 12,045,991 B2 | 7/2024 | Bruder et al. | |
| 12,203,880 B2 | 1/2025 | Wagner et al. | |
| 2011/0096900 A1 * | 4/2011 | Park | G01N 23/083 378/51 |
| 2011/0222656 A1 * | 9/2011 | Matoba | G01N 23/083 378/62 |
| 2014/0154401 A1 * | 6/2014 | Salot | G01R 31/396 427/8 |
| 2019/0064277 A1 * | 2/2019 | Cai | H01M 10/482 |
| 2019/0293720 A1 * | 9/2019 | Fujita | H01M 10/48 |
| 2020/0350637 A1 * | 11/2020 | You | G01N 23/046 |
| 2020/0363344 A1 * | 11/2020 | Heo | G01N 23/18 |
| 2021/0036384 A1 * | 2/2021 | Imada | G01J 5/48 |

(Continued)

*Primary Examiner* — David J Makiya
*Assistant Examiner* — Soorena Kefayati

(57) ABSTRACT

A method for detecting defects in battery cells includes receiving an X-Ray radiographic image of a battery cell and segmenting the X-Ray radiographic image into regions of interest using a classifier. The method includes processing the segmented X-Ray radiographic image using the classifier to identify features of the battery cell, detecting whether one or more of the features in the processed X-Ray radiographic image is defective using the classifier, and determining using the classifier whether the battery cell is defective based on whether one or more of the features in the processed X-Ray radiographic image is defective.

20 Claims, 11 Drawing Sheets

(56) References Cited

U.S. PATENT DOCUMENTS

| | | | |
|---|---|---|---|
| 2021/0234207 A1* | 7/2021 | Chae | H01M 50/105 |
| 2023/0327222 A1* | 10/2023 | Hong | H01M 10/4228 29/623.1 |

* cited by examiner

X-RAY RADIOGRAPHS BASED FAULT DETECTION AND PREDICTION FOR BATTERY CELLS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to batteries and more particularly to X-Ray radiographs-based fault detection and prediction for battery cells.

Batteries are used to power a variety of equipment including vehicles such as automobiles. Battery packs are comprised of battery cells connected to each other. Each battery pack can be comprised of cell modules connected to each other. Each cell module comprises a plurality of cells connected to each other. Each cell typically comprises a plurality of anodes and cathodes. The anodes are connected to a first electrode of the cell. The cathodes are connected to a second electrode of the cell. The first and second electrodes are also called first and second tabs. The cell electrode stack is typically encapsulated in an enclosure such as a pouch or some other type of enclosure. The first and second tabs are external to the enclosure. Some cells have the first and second tabs located on the same side of the cells while others have the first and second tabs located on opposite sides of the cells.

SUMMARY

A method for detecting defects in battery cells comprises receiving an X-Ray radiographic image of a battery cell and segmenting the X-Ray radiographic image into regions of interest using a classifier. The method comprises processing the segmented X-Ray radiographic image using the classifier to identify features of the battery cell, detecting whether one or more of the features in the processed X-Ray radiographic image is defective using the classifier, and determining using the classifier whether the battery cell is defective based on whether one or more of the features in the processed X-Ray radiographic image is defective.

In another feature, the method further comprises detecting an extraordinary condition in the battery cell using a unary classifier that is different than the classifier.

In another feature, the detecting comprises detecting one or more of a tear in a foil of an anode or a cathode in the battery cell, a fold in the foil, a defect in a first weld region comprising welded foils of anodes or cathodes of the battery cell, and a defect in a second weld region comprising the welded foils welded to a tab of the battery cell.

In another feature, one or more of the features indicate one or more of a quality of welding of foils of anodes or cathodes of the battery cell and a quality of welding of the welded foils to a tab of the battery cell.

In another feature, the segmenting the X-Ray radiographic image comprises highlighting the regions of interest in the X-Ray radiographic image, separating the regions of interest from each other, and labeling the regions of interest.

In another feature, the method further comprises using the segmenting to mask a selected one of the features for further processing.

In another feature, the method further comprises using the segmenting to mask one of the features to facilitate the processing of another one of the features.

In another feature, the method further comprises training the classifier by selectively augmenting one or more of the regions of interest without causing an artifact in the X-Ray radiographic image. The augmenting comprises one or more of flipping, translating, and rotating the X-Ray radiographic image or a portion thereof.

In another feature, the augmenting excludes contrast changes, adding noise, and blurring the X-Ray radiographic image or a portion thereof.

In another feature, the detecting whether one or more of the features is defective comprises detecting, in the X-Ray radiographic image, an edge of a tab of the battery cell to which foils of anodes or cathodes of the battery cell are welded; measuring, relative to the edge of the tab, dimensions of a first weld region comprising the welded foils and a second weld region comprising the welded foils welded to the tab of the battery cell; and comparing the dimensions to respective thresholds.

In another feature, the detecting whether one or more of the features is defective comprises detecting, in the X-Ray radiographic image, an edge of a tab of the battery cell to which foils of anodes or cathodes of the battery cell are welded; fitting a line perpendicular to the edge of the tab; encapsulating a region of the welded foils between the edge and an end of the tab in a bounding box; scanning the line across the edge and the bounding box; measuring intersections of the line with the edge and two sides of the bounding box that are relatively parallel to the edge; and determining whether the welding of the foils is defective based on the measurements.

In still other features, a system comprises an X-Ray source, a detector, and a computing device. The X-Ray source is configured to irradiate a portion of a battery cell, where the portion comprises portions of foils of anodes or cathodes of the battery cell and a tab of the battery cell to which the foils are welded. The detector is configured to record an X-Ray radiographic image of the portion of the battery cell generated by irradiating the portion of the battery cell. The computing device is coupled to the detector. The computing device is configured to receive the X-Ray radiographic image of the battery cell and segment the X-Ray radiographic image into regions of interest using a classifier. The computing device is configured to process the segmented X-Ray radiographic image using a classifier to identify features of the battery cell, detect whether one or more of the features in the processed X-Ray radiographic image is defective using the classifier, and determine using the classifier whether the battery cell is defective based on whether one or more of the features in the processed X-Ray radiographic image is defective.

In another feature, the classifier is configured to detect an extraordinary condition in the battery cell using a unary classifier that is different than the classifier.

In another feature, the classifier is configured to detect one or more of a tear in a foil of an anode or a cathode in the battery cell, a fold in the foil, a defect in a first weld region comprising welded foils of anodes or cathodes of the battery cell, and a defect in a second weld region comprising the welded foils welded to a tab of the battery cell.

In another feature, one or more of the features indicate one or more of a quality of welding of foils of anodes or cathodes of the battery cell and a quality of welding of the welded foils to a tab of the battery cell.

In another feature, the classifier is configured to segment the X-Ray radiographic image by highlighting the regions of interest in the X-Ray radiographic image, separating the regions of interest from each other, and labeling the regions of interest.

In another feature, the classifier is configured to use the segmentation to mask a selected one of the features to further segment the selected one of the features for further processing and to facilitate the processing of another one of the features.

In another feature, the computing device is configured to train the classifier by selectively augmenting one or more of the regions of interest by one or more of flipping, translating, and rotating the X-Ray radiographic image or a portion thereof without causing an artifact in the X-Ray radiographic image. The augmenting excludes contrast changes, adding noise, and blurring the X-Ray radiographic image or a portion thereof.

In another feature, the classifier is configured to detect whether one or more of the features is defective by detecting, in the X-Ray radiographic image, an edge of a tab of the battery cell to which foils of anodes or cathodes of the battery cell are welded; measuring, relative to the edge of the tab, dimensions of a first weld region comprising the welded foils and a second weld region comprising the welded foils welded to the tab of the battery cell; and comparing the dimensions to respective thresholds.

In another feature, the classifier is configured to detect whether one or more of the features is defective by detecting, in the X-Ray radiographic image, an edge of a tab of the battery cell to which foils of anodes or cathodes of the battery cell are welded; fitting a line perpendicular to the edge of the tab; encapsulating a region of the welded foils between the edge and an end of the tab in a bounding box; scanning the line across the edge and the bounding box; measuring intersections of the line with the edge and two sides of the bounding box that are relatively parallel to the edge; and determining whether the welding of the foils is defective based on the measurements.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1C:
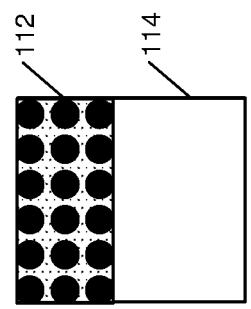
FIGS. 1A-1C show a cross-sectional view of a battery cell.

In the present disclosure, a pouch-type battery cell is initially described only as an example and all descriptors of the pouch-type battery cell are for example only. The systems and methods described in the present disclosure are not limited to the specific example or any other specific type of battery cells. Rather, the systems and methods described in the present disclosure can be used with any other type of battery cells.

In some battery cells, anodes and cathodes are typically made of thin foils. During manufacturing, ends of the foils of the anodes are welded together, and the welded portion of the foils is welded to a first electrode of the battery cell. Similarly, ends of the foils of the cathodes are welded together, and the welded portion of the foils is welded to a second electrode of the battery cell. The first and second electrodes of the cell are also called first and second tabs of the battery cell, respectively.

During manufacturing of the battery cells and subsequent use of the battery cells in the batteries installed in vehicles, several defects can occur. For example, during manufacturing, the foils in the battery cells, which are very thin (e.g., on the order of about 10 microns in thickness), may crack and/or fold. Further, the welding of the foils to the tabs may have defects. Furthermore, after the batteries are installed in vehicles, during use, cracking of the foils and/or additional defects can occur in the battery cells.

Various methods, including X-Ray radiograph-based methods, are used to detect these defects in the battery cells. These methods typically include baseline techniques (e.g., rule-based algorithms) used to automate interpretation of the X-Ray radiographs. These methods can achieve reliable acquisition of the X-Ray radiographs for automatic detection of discontinuities in electrode stacks in the battery cells. However, these methods require high quality and repeatable X-Ray radiographs to achieve robust computer vision-based algorithms for reliably verifying the quality of the battery cells.

Further, during development of these rule-based algorithms, the developer needs to anticipate all possible variations that can occur during production (and in post-production use) to create a robust and highly accurate fault-detection system. Complex surface textures and variations in appearances of cell components present serious challenges in these computer vision-based inspection systems. These rules-based vision systems cannot accurately capture variability and deviations between visually similar components. To address variations in defect detection, algorithm complexity increases, which leads to a less robust and less accurate system, and which is more computationally intensive. Furthermore, in practice, it is impossible for humans to anticipate all types of defects that can possibly occur during manufacturing and subsequent use of the battery cells. In contrast, machine learning algorithms described below are not as sensitive to unexpected variations.

The systems and methods of the present disclosure address the deficiencies in the above methods by improving automated fault detection and prediction with improved throughput and accuracy. The systems and methods can be extended to assess weld quality detection via automatic and repeatable acquisition and interpretation of X-Ray radiographic images using machine learning and deep learning techniques as described below in detail. The systems and methods enable evaluation of the radiographic images by using deep learning and unary classifiers to detect defects including foil tear and weld quality issues in battery cells.

Specifically, the machine learning and deep learning techniques of the present disclosure utilize image segmentation, which allows inspection of individual features in an image rather than analyzing the image as a whole and classifying the whole image as normal or faulty. Further, classifiers can be trained to detect unanticipated or unexpected failures as described below in detail. Image segmentation-based deep learning, which is described below in detail, can enhance fault detection in vision applications. Performing enhanced fault detection reliably is difficult using the rules-based algorithms when confusing backgrounds and variations in component appearances are present. In contrast, the image segmentation-based deep learning techniques of the present disclosure can easily manage confusing backgrounds and variations in component appearances. Additionally, image segmentation is more suitable than the rules-based algorithms to maintain applications and to retrain models using new image data collected on factory floor rather than increasing complexity, which is necessary in a rule-based algorithm. The image segmentation-based deep learning techniques are easier than the rules-based algorithms to adapt to new samples without reprogramming.

The systems and methods of the present disclosure comprise the following features, which are described below in further detail. The systems and methods employ computer vision based on X-Ray radiographic images for automatic detection of foil defects (e.g., tears, folds, and welding defects) by automatic interpretation of the radiographic images. The automatic detection of foil defects is achieved by implementing a computer vision algorithm for automatic region-of-interest determination, defect detection, and defect verification for instances where defects are difficult to detect using difference-based techniques in the images. The defect detection can be further enhanced by preprocessing the radiographic images as described below in detail.

The systems and methods can be extended to assess other cell features such as foil folds, pre-weld dimension and weld-to-tab edge dimension (explained below), and weld quality features. For example, the accuracy of tear prediction is enhanced by identifying more pixels corresponding to a tear region as a tear, increasing robustness (e.g., by tolerating more variation in environmental conditions), and decreasing training complexity for new models since the amount of manual effort is lower for machine learning than manual rule-based techniques. Further, additional weld quality features identified in the radiographic images are used to detect and predict welding defects. Examples of these features include high-density welds identified in the X-Ray radiographic images indicating spatter, and low-density weld regions identified in the X-Ray radiographic images indicating foil detachment (along perimeter) or porosity (near center).

The systems and methods achieve these capabilities by using the following X-Ray radiograph-specific inputs for the machine learning models. For example, the following image segmentation techniques are used: full tear segmentation, tear edge segmentation (e.g., using masks), pre- and post-processed image segmentation, X-Ray radiograph-specific scaling to minimize artifacts, and X-Ray radiograph-specific augmentation (e.g., flipping, small translations, and rotations of images, and avoiding non-X-Ray augmentation strategies such as contrast changes, adding noise or blurring, etc.) or any other augmentation that may obstruct identifying defective features. Using these image segmentation techniques, the systems and methods can detect actual tear region rather than merely detecting presence or absence of tear and can detect welding defects in detail.

Additional unary classifiers are used to detect suspect samples with unexpected issues, which can assist in developing new cell designs or X-Ray set-ups and can also enable monitoring of manufacturing processes. A unary classifier is trained using good (i.e., fault-free) samples to detect outliers. The unary classifier can detect any sample that deviates from a population of good samples. The unary classifiers are useful for detecting samples that are suspect when most samples are found good (i.e., when few to no samples are faulty). That is, the unary classifiers are useful for detecting issues other than tear/fold/weld defects in samples even when none of these faults is detected in the samples. The unary classifiers are useful in monitoring a process or detecting unexpected issues like a stray or misplaced part detected in an image.

These classifiers (i.e., the machine learning model trained to detect defects and the unary classifiers) can be used in combination with each other to achieve high accuracy in detecting the faults and unexpected issues. Thus, the systems and methods of the present disclosure automate image processing for defect detection using image segmentation and deep learning as described below in further detail.

The present disclosure is organized as follows. An example of a battery cell is shown and described with reference to FIGS. 1A-1C. An X-Ray radiograph-based system for detecting defects in battery cells is shown and described with reference to FIGS. 2A-2C. A method for detecting and predicting defects in the battery cells using the X-Ray radiograph-based system is shown and described with reference to FIG. 3. An example of a tear in a foil of a battery cell is shown and described with reference to FIGS. 4A-4C. Examples of various measurements performed by the method to assess integrity of welds and detect weld defects in the battery cells are shown and described with reference to FIGS. 5 and 6A-6D. Sub-steps of some of the steps of the method are shown and described with reference to FIGS. 7-11. An example of a server used in X-Ray radiograph-based system is shown and described with reference to FIG. 12.

Example of Battery Cell

Figure 1B:
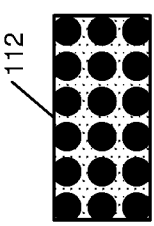
Figure 1A:
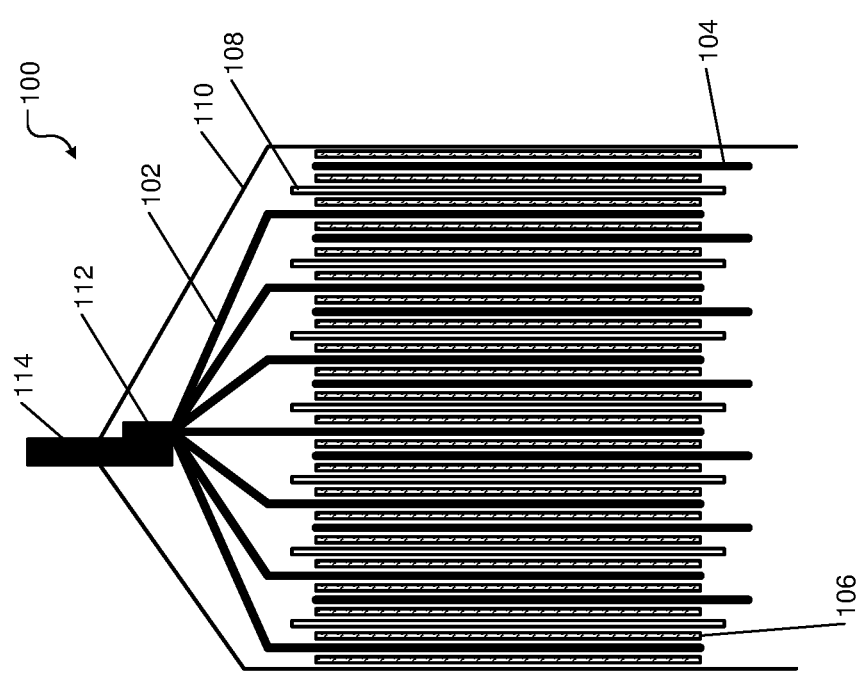

FIGS. 1B-1C show an example of a battery cell 100. FIG. 1A shows a cross-sectional view of the battery cell 100. The battery cell 100 comprises a plurality of anodes 102 and cathodes 104. The battery cell 100 further comprises a plurality of layers of an active material 106 and a separator 108. These elements are stacked in the following order: active material 106, anode 102, active material 106, separator 108, active material 106, cathode 104, active material 106, and so on. The stack of these elements is generally called an electrode stack of the battery cell 100. The battery cell 100 is enclosed in an enclosure (e.g., a pouch) 110.

The anodes 102 and the cathodes 104 are generally made of thin foils, which are current collectors. During manufacture of the battery cell 100, two welding operations are performed. In a first welding operation, ends of the foils of the anodes 102 are welded together to form a welded anode 112 as shown in FIG. 1B. The first welding operation is also called a foil weld or a pre-weld operation. Subsequently, in a second welding operation, the welded anode 112 is welded to an edge of a first electrode (also called a first tab) 114 of the battery cell 100 as shown in FIG. 1C. The second welding operation is also called a tab weld or a main weld operation.

While not shown, using similar foil weld and tab weld operations, ends of the foils of the cathodes 104 are welded together to form a welded cathode, which is then welded to an edge of a second electrode (also called a second tab) of the battery cell 100. The welding of the anodes 102 and the welding of the cathodes 104 may be collectively called the foil welds. The welding of the welded anode 102 to the first tab 114 and the welding of the welded cathodes 104 to the second tab may be collectively called the tab welds.

During the manufacturing of the battery cells 100 and subsequent use of the battery cells 100 in the batteries installed in vehicles, several defects can occur. For example, during the manufacturing, the foils of the anodes 102 and the cathodes 104 in the battery cells 100, which are very thin (e.g., on the order of a few microns in thickness), may crack and/or fold, particularly near the edges of the corresponding tabs. Further, the welding of the foils of the anodes 102 and the cathodes 104 themselves as well as to the respective tabs may have welding defects.

Furthermore, after the batteries are installed in vehicles, during use, cracking of the foils of the anodes 102 and the cathodes 104 and/or additional defects can occur in the battery cells 100. Since the foils, the welds of the foils, and the welds of the welded foils to the tabs are inside the battery cells 100, any defects therein are invisible externally (i.e., from the outside of the battery cells 100).

Therefore, the present disclosure provides an X-Ray radiograph-based system described below to detect these defects. The following description regarding the anodes 102, the welded anodes 112, and the tab 114 also applies to the cathodes 104, the welded cathodes, and corresponding tab.

X-Ray Radiograph-Based System

Figure 2C:
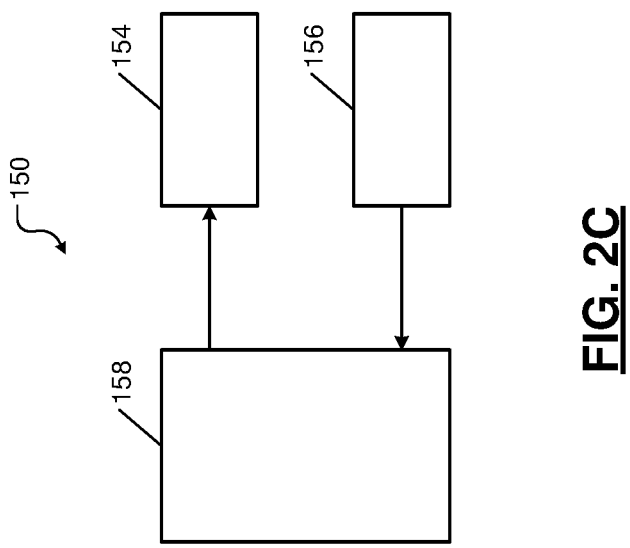
FIGS. 2A-2C show an X-Ray radiograph-based system used to detect and predict defects in battery cells.
Figure 2B:
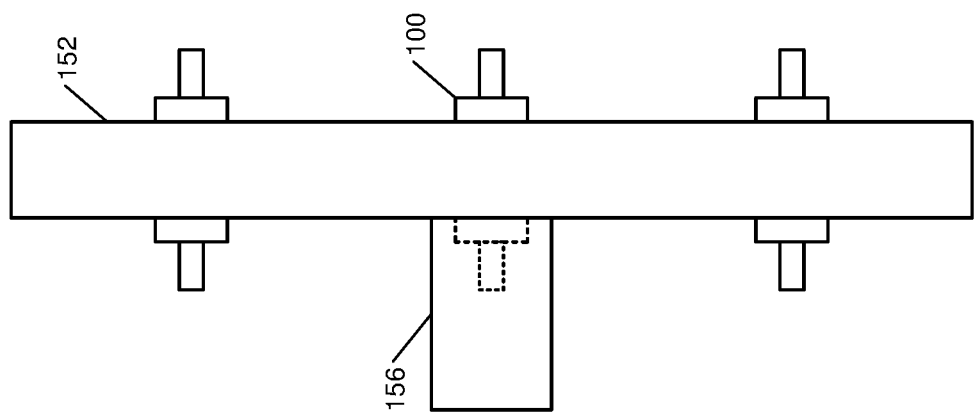
Figure 2A:
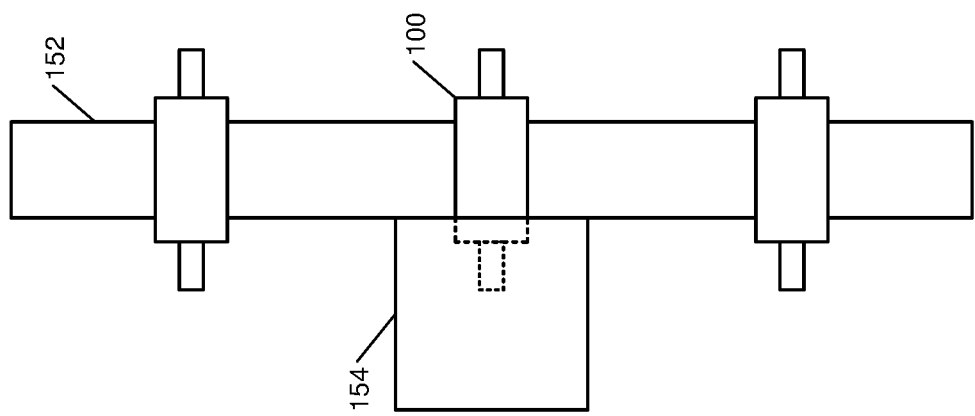

FIGS. 2A-2C show an example of an X-Ray radiograph-based system 150 used to detect the defects in the battery cells 100. FIG. 2A shows a top view of the X-Ray radiograph-based system 150. FIG. 2B shows a bottom view of the X-Ray radiograph-based system 150. FIG. 2C shows a functional block diagram of the X-Ray radiograph-based system 150.

In FIGS. 2A and 2B, the X-Ray radiograph-based system 150 comprises a conveyor 152 carrying a plurality of the battery cells 100. The X-Ray radiograph-based system 150 comprises an X-Ray source 154 and a detector 156. The conveyor 152 carrying the plurality of the battery cells 100 passes between the X-Ray source 154 and the detector 156.

The X-Ray source 154 emits X-rays. The X-rays from the X-Ray source 154 pass through an end portion of the battery cells 100 where a portion of the foils of the anodes 102 that are welded to form the welded anodes 112, the welded anodes 112, and the joint of the welded anodes 112 to the tab 114 of the battery cells 100 are located. The X-rays from the X-Ray source 154 pass through the end of the battery cells 100 and are incident on the detector 156. The detector 156 collects X-ray radiographic images of the ends of the battery cells 100. The X-ray radiographic images include data about a portion of the foils of the anodes 102, the welded anodes 112, and the joint of the welded anodes 112 to the tab 114 of the battery cells 100.

When the battery cells 100 have both tabs on the same side, the X-rays from the X-Ray source 154 also pass through a portion of the foils of the cathodes 104, the welded cathodes, and the joint of the welded cathodes to the other tab of the battery cells 100. When the X-rays pass through the end of the battery cells 100 and are incident on the detector 156 and the detector 156 collects X-ray radiographic images of the ends of the battery cells 100, the X-ray radiographic images also include data about a portion of the foils of the cathodes 104, the welded cathodes, and the joint of the welded cathodes to the other tab of the battery cells 100.

While not shown, when the battery cells 100 have the tabs on opposite sides of the battery cells 100, the X-Ray radiograph-based system 150 may also comprise another X-Ray source and another detector located on an opposite side of the conveyor 152. The X-rays from the other X-Ray source pass through another end of the battery cells 100 where a portion of the foils of the cathodes 104 that are welded to form the welded cathodes, the welded cathodes, and the joint of the welded cathodes to the other tab of the battery cells 100 are located. The X-rays from the other X-Ray source pass through the other end of the battery cells 100 and are incident on the other detector. The other detector collects X-ray radiographic images of the other end of the battery cells 100. The X-ray radiographic images include data about a portion of the foils of the cathodes 104, the welded cathodes, and the joint of the welded cathodes to the other tab of the battery cells 100.

In FIG. 2C, the X-Ray radiograph-based system 150 comprises a computing device (e.g., a server) 158. The server 158 includes a computing device that comprises one or more processors, memory, and so on for processing the X-ray radiographic images. An example of the server 158 is shown and described below in detail with reference to FIG. 12. The server 158 can be a local (standalone) computing device or can be connected to a network to remotely monitor and control the X-Ray radiograph-based system 150 and/or to facilitate remotely performing at least partial processing described herein. In some examples, the server 158 may be implemented in a controller integrated with the X-Ray source 154 and the detector 156. Further, in some examples, a portion of the server 158 may be implemented in a cloud, and the portion implemented in the cloud may interface with a remainder of the server 158 or the remainder integrated with the X-Ray source 154 and the detector 156. The tasks of training the classifiers and using the trained classifiers to test the battery cells 100 may be shared between the portion integrated in the cloud and the remainder.

The server 158 is connected to the X-Ray source 154 and the detector 156. While not shown the server 158 may also be connected to the other X-Ray source and the other detector, which are described above with reference to FIGS. 2A-2C. The server 158 receives the X-ray radiographic images from the detector 156 and the from the other detector (hereinafter collectively the detector 156). The server 158 processes the X-ray radiographic images received from the detector 156 to detect defects such as foil tear, welding defects, and other defects as describe below in detail with reference to FIGS. 3A-11.

Method for Detecting Defects in Battery Cells

Figure 3:
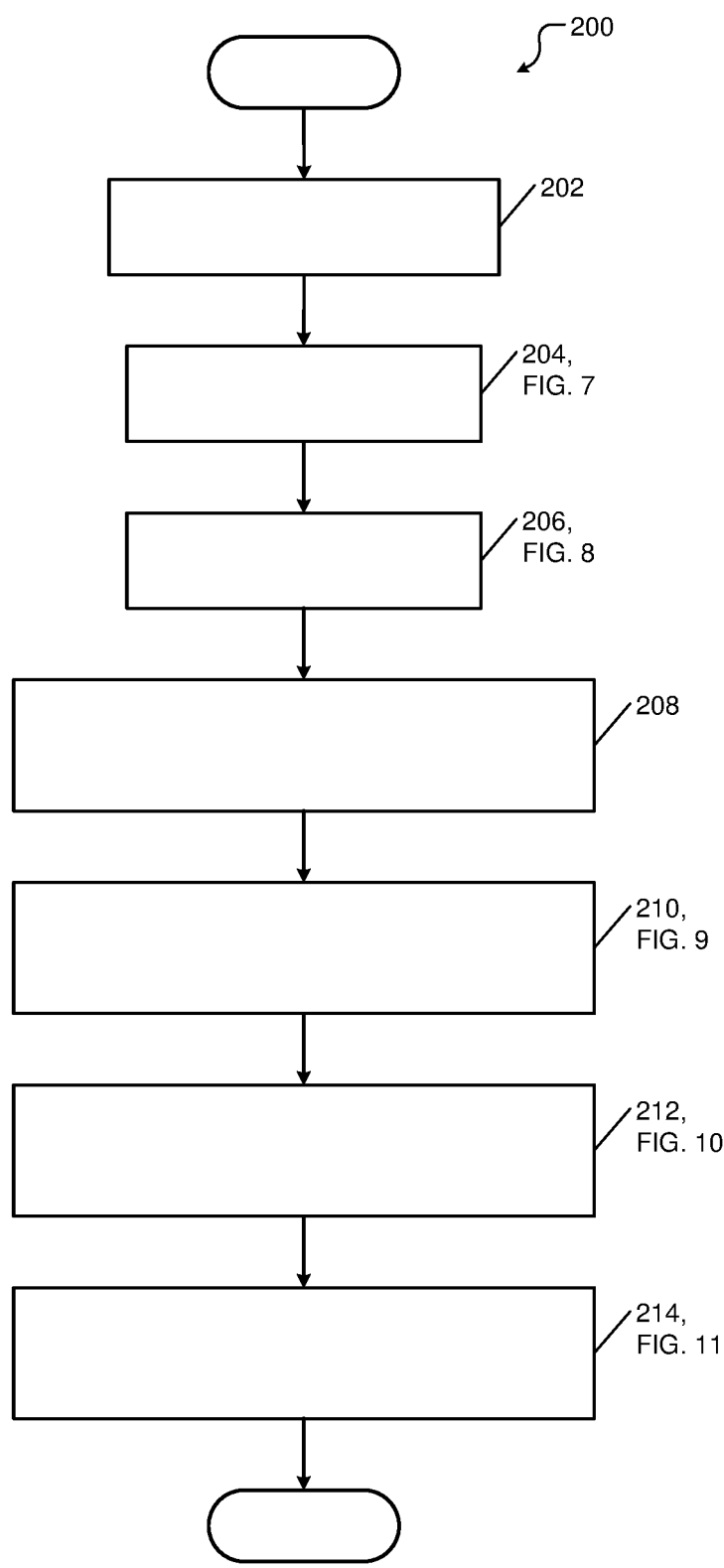
FIG. 3 shows a flowchart of a method for detecting and predicting defects in battery cells using the X-Ray radiograph-based system of FIGS. 2A-2C.

FIG. 3 shows a method 200 for processing the X-ray radiographic images from the X-Ray radiograph-based system 150 and detecting defects such as foil tear, welding defects, and other defects in the battery cells 100 according to the present disclosure. For example, the method 200 is performed by one or more processors in the server 158. The method 200 comprises a training phase and a runtime phase that are performed separately. During the training phase, steps 202-210 shown in FIG. 3 can be performed iteratively to train the classifiers until a desired performance of the trained classifiers is obtained. During the iterations, the training images, the processing of the images, and the augmentation of the images can be modified to obtain the required performance of the classifiers. For example, based on any incorrectly classified images by partially trained classifiers, the above-mentioned changes can be made as needed to improve the training of the classifiers. Further, a hybrid approach can also be used, where traditional vision-based methods can used in conjunction with deep learning to complete the evaluation of the trained classifiers before the trained classifiers can be used during run time in steps 212 and 214. During the runtime phase, only the steps 212 and 214 are performed.

At 202, the method 200 receives the X-ray radiographic images of the end portions of the battery cells 100 from the detector 156. At 204, the method 200 processes the X-ray radiographic images to highlight any tears (or folds) in the foils of the anodes 102 and the cathodes 104 and to highlight the weld regions of the foil welds and the tab welds in the X-ray radiographic images. The highlighting includes use of colors or any other techniques that can be used to identify, isolate, and separate one region of interest (e.g., a tear) from another region of interest (e.g., a weld region) in the X-ray radiographic images.

The highlighted regions in the X-ray radiographic images are generally called regions of interest from which, after augmenting the X-ray radiographic images as described below, the trained classifier identifies features and detects defects in the identified features as described below. The tears, folds, and the weld regions are collectively called features of the battery cell 100, where feature is a term of art known and used in the fields of traditional vision- and machine learning-based training.

At 206, the method 200 labels the features in the X-ray radiographic images. Thus, the method 200 segments the X-ray radiographic images by highlighting and labeling the features in the X-ray radiographic images.

The segmentation of the X-ray radiographic images performed by the method 200 as described above provides many advantages in training a classifier and subsequently detecting faults in the battery cells 100 using the trained classifier. The segmentation of the X-ray radiographic images is performed using machine learning. Traditionally, an entire image is labeled as bad (fail) if the image or a portion thereof indicates a problem compared to a known good image. Conversely, an entire image is labeled as good (pass) if the image indicates no problem compared to a known good image. In contrast, the method 200 inspects every pixel in an X-ray radiographic image and groups the pixels in different portions of the X-ray radiographic image as belonging to different features.

Accordingly, the method 200 can train the classifier to classify each feature in an X-ray radiographic image as good or bad rather than classifying the entire X-ray radiographic image as a whole as being good or bad. Segmentation effectively clusters areas or regions of an X-ray radiographic where features of interest may occur. The individual areas or regions in the entire X-ray radiographic where features of interest may occur are classified. Segmentation is used to direct the machine learning algorithm to the areas or regions of an X-ray radiographic where features of interest may occur. As used herein, good means defect-free or fault-free, and bad means defective or faulty.

For example, if a pattern of pixels in a weld region in an X-ray radiographic image matches with a known pixel pattern for a good weld, the trained classifier can determine that the weld feature in the X-ray radiographic image is good. Additionally, if a pattern of pixels in a foil region in the same X-ray radiographic image does not match with a known pixel pattern for a good foil region, the trained classifier can determine that the foil has a tear, a fold, or some other defect. The trained classifier can then indicate that the X-ray radiographic image indicates a failure and can additionally indicate which feature in the X-ray radiographic image has failed. Thus, the method 200 detects not only a bad X-ray radiographic image but further detects which feature is faulty in the X-ray radiographic image.

Further, the classifier of the method 200 also differs from traditional classifiers. The classifier of the method 200 performs deep learning using only the segmented X-ray radiographic images and the labels provided for the features. Based on the labels, the classifier itself identifies the features in the segmented X-ray radiographic images. In contrast, in traditional classifiers, the features are identified from the images, extracted from the images, and fed to the classifiers for deep learning. Thus, the segmentation of the X-ray radiographic images significantly simplifies the training of the classifier and subsequent detection of faults using the trained classifier.

At 206, the method 200 further processes the segmented X-ray radiographic images and the labels for the features to improve the training, testing, and performance of a classifier (also called a deep learning classifier to distinguish from the unary classifiers) that is used to detect defects in the battery cells 100. For example, since the X-ray radiographic images include data from the left-hand side and the-right hand side of the tabs, the method 200 doubles the number of samples by flipping the X-ray radiographic images along a vertical axis (i.e., an axis perpendicular to a length of a tab). Doubling the number of samples significantly improves the ability to train and test the classifier, which in turn improves the performance of the trained classifier in detecting defects in the battery cells 100. The data from the left- and right-hand sides of the tabs may be used when the detector 156 cannot capture the X-Ray radiographic image of the entire tab while maintaining the desired resolution. Instead, for a lower resolution, the detector 156 can capture the X-Ray radiographic image of the entire tab, which case data from the X-Ray radiographic image of the entire tab may be used.

Additionally, the method 200 performs X-Ray specific image augmentations on the segmented X-ray radiographic images. For example, the method 200 resizes the X-ray radiographic images, shifts the segmented X-ray radiographic images along X and Y axes, and so on. For example, some of the X-ray radiographic images can be large (e.g., of high resolution). Accordingly, the method 200 scales some features. For example, some features can be shrunk or enlarged depending on the resolution of the X-ray radiographic images. However, scaling can generally cause artifacts in the scaled portions of the X-ray radiographic images. Such artifacts can be misleading in detecting defects. Therefore, the method 200 uses scaling methods that scale portions of the X-ray radiographic images while minimizing loss of detail in the features and in some instances without causing artifacts.

Additional non-limiting examples of augmentations performed by the method 200 include flipping, translations, rotations of the X-ray radiographic images or portions thereof. Routine non-Xray image augmentation techniques such as contrast changes, adding noise or blurring, etc. are not used since such techniques can obstruct or obliterate the features and make detecting the features difficult. Other augmentation methods can be used while avoiding those that can adversely impact feature detection.

At 208, the method 200 trains the deep learning classifier using the processed X-ray radiographic images and the labeled features therein. The method 200 trains the classifier to detect and predict defects such as tears and folds in the foils of the anodes 102 and the cathodes 104, weld quality detects in the foil welds and the tab welds, and other defects. The method 200 trains the classifier to detect and predict the defects by using masking operations and by performing various feature measurements on the processed X-ray radiographic images. Masking is used during the training to better define classifications used during segmentation training. Examples of the masking operations are shown and described below with reference to FIGS. 4A-4C. Examples of the feature measurements are shown and described below with reference to FIGS. 5-6D.

At 210, the method 200 trains additional unary classifiers to detect unexpected defects that can occur in the battery cells 100. For example, X-ray radiographic images that contain none of the above-mentioned defects (e.g., tears, folds, and welding defects) can be used to train one or more unary classifiers to detect outlier conditions that are unexpected (i.e., outside the range of normal manufacturing process) but can still occur in the battery cells 100. X-ray radiographic images in which the classifier that is trained to detect the above-mentioned defects detects no defects are classified good images. A population of known good images is used to train one or more unary classifiers. Each unary classifier is trained to detect a particular outlier condition that is typically unexpected but can occur in the battery cells 100.

For example, a unary classifier can be trained to detect a feature in the X-ray radiographic images such as an unexpected white or black spot (e.g., due to a hole in a foil) or an indication indicating deviation from a typical geometry (e.g., geometry of a foil or a tab) of the battery cells 100. Such a feature may indicate an extraordinary condition in an otherwise defect-free X-ray radiographic image. The X-ray radiographic images containing such features are flagged as suspect rather than pass or fail. The suspect X-ray radiographic images and corresponding battery cells 100 can then be further evaluated for improving the manufacturing process and/or design of the battery cells 100 to avoid the occurrence of the unexpected conditions in the battery cells 100. Thus, the unary classifiers may serve as a second-level check in addition to the classifier trained to detect the above-mentioned defects. In some implementations, if the number of defects detected tend to be minimal, the unary classifier alone can be used as a primary classifier instead of using the classifier trained to detect the above-mentioned defects.

Further, as described above, the steps 202-210 can be performed iteratively to train the deep learning and unary classifiers until a desired performance of the trained classifiers is obtained, where, during the iterations, the training images, the processing of the images, and the augmentation of the images can be modified to obtain the required performance of the classifiers (e.g., based on any incorrectly classified images by partially trained classifiers, the above-mentioned changes can be made as needed to improve the training of the classifiers). Further, a hybrid approach combining traditional vision-based methods and deep learning can also be used to complete the evaluation of the trained classifiers before the trained classifiers can be used during run time in steps 212 and 214 as described below.

At 212, during run time (i.e., in use), the method 200 uses the trained deep learning classifier and the trained unary classifiers to automatically detect and predict defects and outlier conditions in the battery cells 100. In use (i.e., during run time), the method 200 receives new X-ray radiographic images captured from the battery cells 100. The method 200 processes the new X-ray radiographic images as described above. The trained deep learning classifier can now automatically detect the defects in the battery cells 100. Additionally, the trained unary classifiers can further detect any outlier conditions for further evaluation.

Steps 202-210 of the method 200 are performed to train the deep learning classifier and to train the unary classifiers. Steps 212 and 214 of the method 200 are performed during run time to test manufactured battery cells 100 using the trained classifiers. During run time, steps 202-210 are not performed, rather, the trained deep learning classifier and the trained unary classifiers, which are already trained in steps 202-210, are used to test the manufactured battery cells 100.

Thus, during runtime (i.e., in use), a raw image received from the detector 156 is processed and input to the classifier trained to segment the processed image. The trained classifier segments the processed image. Augmentation is used only prior to training the classifier to increase the number of images used to train the classifier. Augmentation is not used when using the classifier during runtime in production. If the classifier detects one or more defective features in the segmented image, the corresponding part of the battery cell is determined to be defective. In some implementations, traditional machine vision is used to calculate features and perform additional assessments.

Throughout the present disclosure, while one deep learning classifier is described, multiple classifiers can be used instead, where each classifier can be trained in the same manner described above to detect a separate defect. For example, a first classifier can be trained and used to detect a tear defect, a second classifier can be trained and used to detect a fold defect, a third classifier can be trained and used to detect welding defects, and so on. Alternatively, a general defect detection classifier can be trained and used to detect all the defects at once. The unary classifiers are different than the deep learning classifiers since the unary classifiers are trained using only good images. Therefore, a trained unary classifier determines if an image being evaluated by the trained unary classifier is out of range based on the population of images used during training. As such, a unary classifier cannot be combined with a defect detection classifier (i.e., a deep learning classifier).

In general, one or more classifiers can be trained and used during runtime in any order. The classifier can be called primary and secondary classifiers based on the application. The classifiers trained to detect known defects (e.g., the one or more deep learning classifiers) can be called primary classifiers. Multiple classifiers can work together. The classifiers trained to detect unknown defects can be called secondary classifiers. In these two categories of classifiers, in case of the primary classifiers used to detect known defects, images with known defects are used for training these classifiers. In case of the secondary classifiers used to detect unknown defects, images with unknown defects do not exist but rather can only be detected. Therefore, while unknown defects can be detected, they cannot be predicted.

Sub-steps of the above steps performed by the method 200 are shown and described below with reference to FIGS. 7-11. Before describing the sub-steps, examples of features such as tear and welds, corresponding measurements, and methods for performing the measurements are shown and described with reference to FIGS. 5-6D.

Example of Foil Tear

Figure 4A:
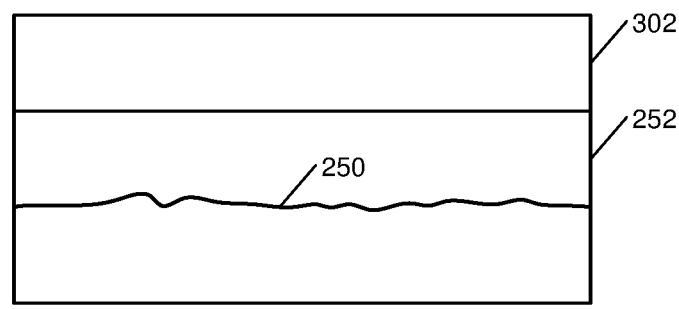
FIGS. 4A-4C show an example of a tear in a foil of the battery cell of FIGS. 1A-1C.
Figure 4B:
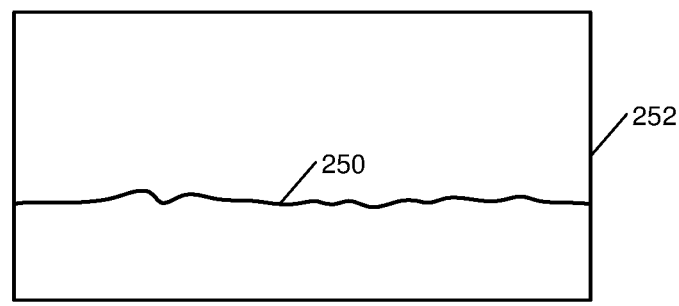
Figure 4C:
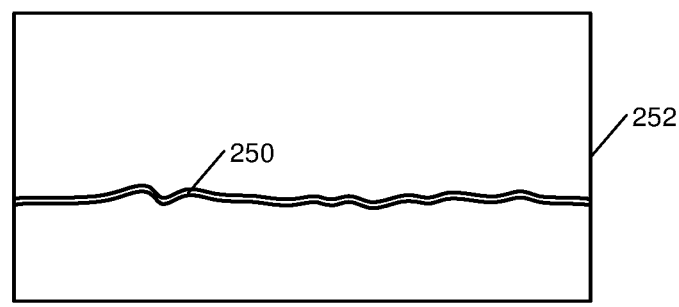

FIGS. 4A-4C show an example of a tear 250 in a foil 252 (e.g., of an anode 102 or a cathode 104) and methods of masking the tear 250. For example, FIG. 4A shows the tear 250 in a foil 252 (e.g., of an anode 102 or a cathode 104) near a pre-weld region 302 (shown in FIG. 5). FIGS. 4B and 4C show two different types of masking methods to further segment the tear 250. FIG. 4B shows the entire region around (including space between the edges of) the tear 250 masked (called full tear segmentation). FIG. 4C shows only the edges of the tear 250 (space between the edges of the tear 250) masked (called tear edge segmentation). In use, the trained classifier employs these masks to separate the tear 250 from the rest of foil 252 so that the unmasked portions the foil 252 in the X-ray radiographic images can be further processed (e.g., to detect and/or further analyze the tear 250 and other detected defects or features such as weld defects).

Examples of Various Measurements

Figure 5:
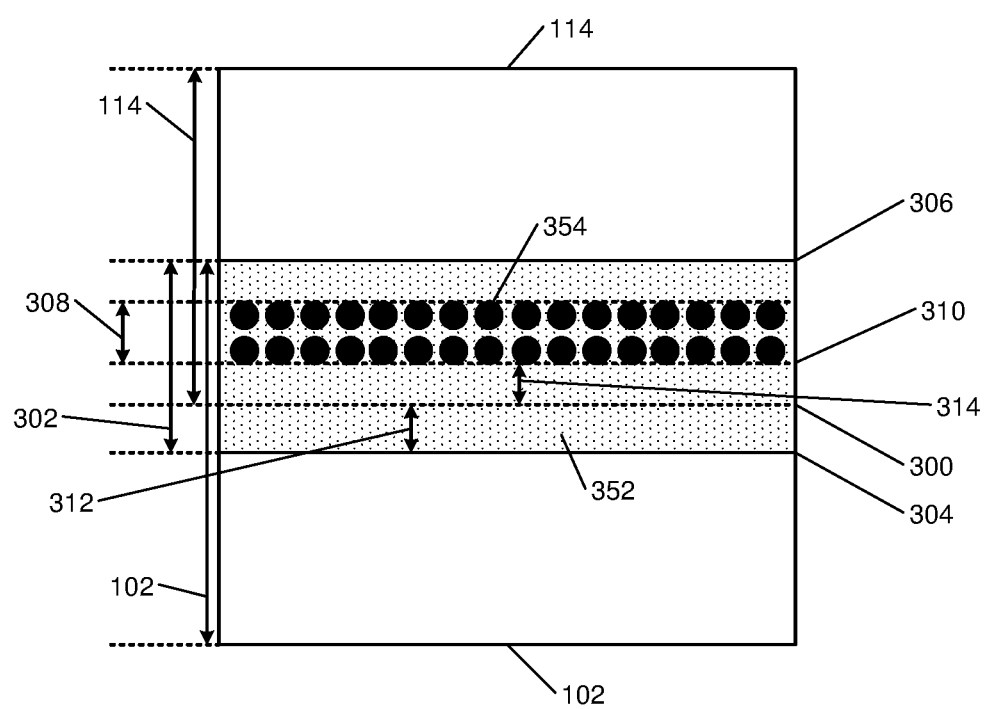
FIGS. 5 and 6A-6D show examples of various measurements performed by the system of FIGS. 2A-2C and the method of FIG. 3 to assess integrity of welds and detect weld defects in the battery cells.
Figure 6A:
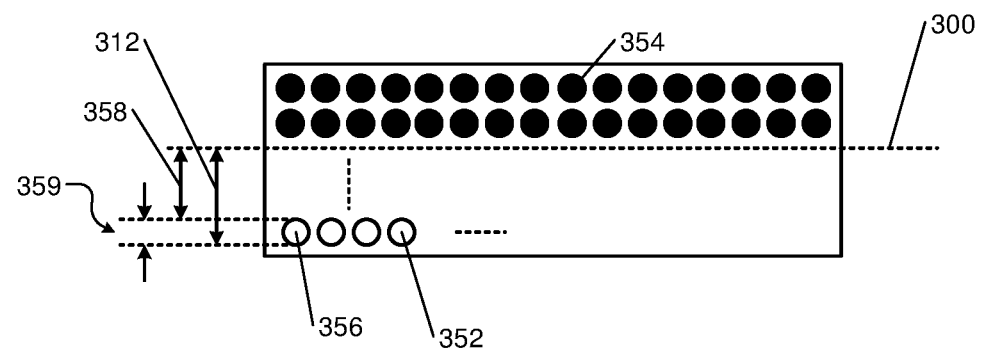
Figure 6B:
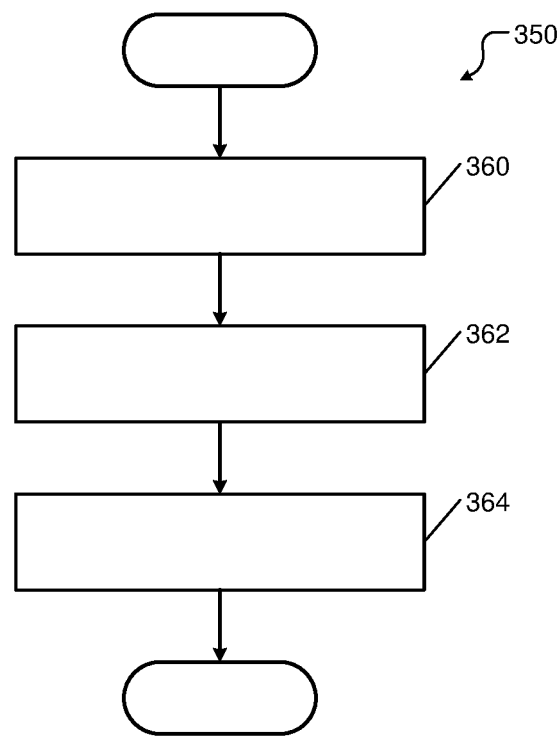
Figure 6C:
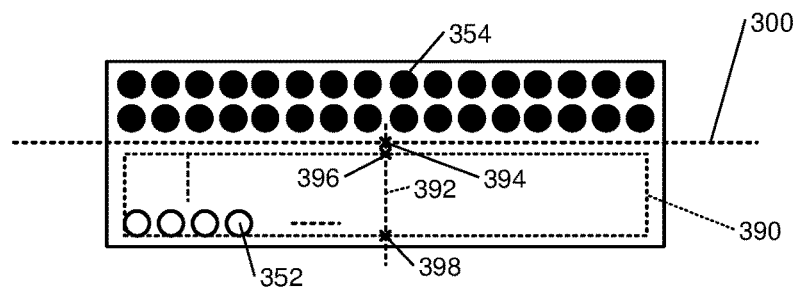
Figure 6D:
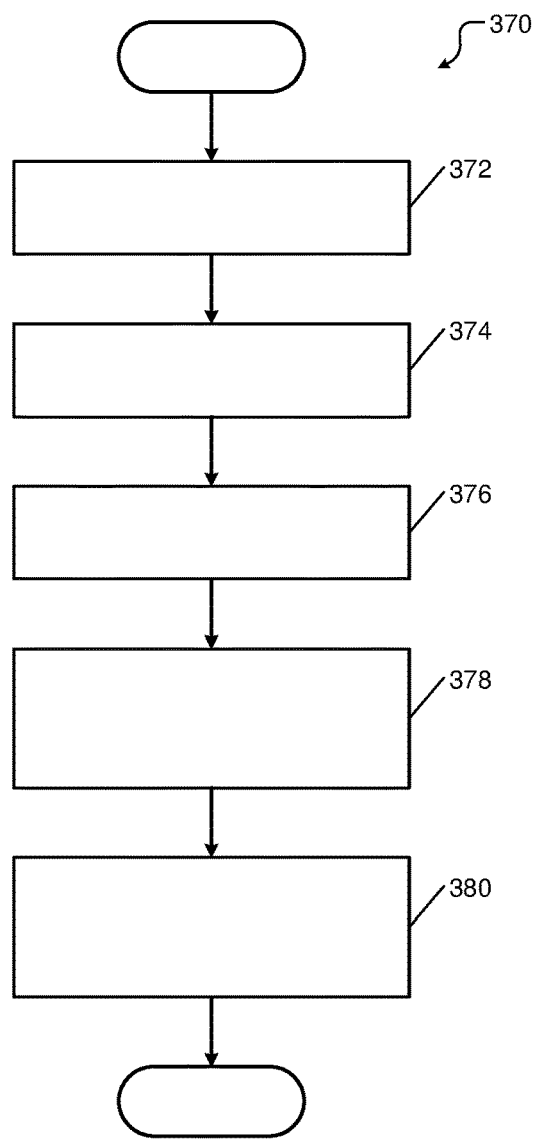

FIGS. 5-6D show various measurements performed by the method 200 to assess integrity of the welds and detect weld defects in the battery cell 100. The classifier described above with reference to FIG. 3 can be trained to detect and predict the defects using these measurements.

In FIG. 5, to weld the welded anodes 112 (shown in FIG. 11B) to the tab 114, the welded anodes 112 are arranged over a first end of the tab 114 (i.e., the end of the tab 114 facing the welded anodes 112 and the battery cell 100). The first end of the tab 114 has an edge 300 that faces in the direction of the foils of the anodes 102 (i.e., faces towards the battery cell 100) and is called a tab edge 300.

The welded foils of the anodes 102 have a pre-weld region (also called a foil weld region) 302. The pre-weld region 302 comprises the welded portions of the foils of the anodes 102 that form the welded anode 112 (shown in FIG. 1B). The pre-weld region 302 comprises pre-weld areas 352 (shown in FIGS. 6A and 6C). A first edge of the pre-weld region 302 faces the foils of the anodes 102 (i.e., faces towards the battery cell 100) and is called a pre-weld edge 304. A second edge of the pre-weld region 302 faces in the direction of (i.e., towards) a second end of the tab (i.e., faces away from the battery cell 100) and is called a foil edge (ends of the foils) 306.

The welded foils of the anodes 102 (i.e., the welded anode 112) are welded to a portion of the tab 114 by welding a portion of the pre-weld region 302 to a portion of the tab 114. A region where the portion of the pre-weld region 302 is welded to the portion of the of the tab 114 is called a main weld region (also called a tab weld region) 308. The main weld region 308 comprises main welds 354 (shown in FIGS. 6A and 6C). An edge of the main weld region 308 facing in the direction of the foils of the anodes 102 (i.e., facing towards the battery cell 100) is called a main weld edge 310.

A distance between the tab edge 300 and the pre-weld edge 304 is called a pre-weld dimension 312. The pre-weld dimension 312 indicates a length of the pre-weld region 302 extending below the tab edge 300. A distance between the tab edge 300 and the main weld edge 310 is called a tab weld dimension 314. The pre-weld dimension 312 and the tab weld dimension 314 indicate weld quality of the main weld (i.e., the weld of the welded anode 112 to the tab 114).

For example, the pre-weld dimension 312 and the tab weld dimension 314 can indicate issues in alignment and setup during the welding process. The misalignment or having the dimensions 312, 314 outside respective specified limits (e.g., greater than or equal to respective predetermined thresholds) can result in defective battery cells. For example, if the pre-weld dimension 312 is greater than or equal to a first predetermined threshold, the pre-weld dimension 312 can indicate one or more of the following issues: a misalignment between the battery cell 100 and welding tool, the tab 114 being misaligned with the stack of the foils of the anode 102, and non-uniform pressure applied during the pre-weld. For example, if the tab weld dimension 314 is greater than or equal to a second predetermined threshold, the tab weld dimension 314 can indicate one or more of the following issues: a misalignment between the battery cell 100 and welding tool, the tab 114 being misaligned with the stack of the foils of the anode 102, and dimensions of the tab 114 being outside of specified dimensions.

FIGS. 6A-6D show two different methods for measuring the pre-weld dimension 312. FIGS. 6A and 6B show a first method 350 for measuring the pre-weld dimension 312. FIGS. 6C and 6D show a second method 370 for measuring the pre-weld dimension 312. Similar methods can be used to measure the tab weld dimension 314. The first and second methods 350, 370 are performed by one or more processors of the server 158 shown in FIG. 2C.

In FIGS. 6A and 6C, the pre-weld areas 352 in the pre-weld region 302 that are below the tab edge 300 (i.e., towards the battery cell 100) are shown using hollow circles. The main welds 354 in the main weld region (also called tab weld region) 308, which are above the tab edge 300 (i.e., towards the second end of the tab 114 referenced in the description of FIG. 5), are shown using solid circles. While circles are used for illustrative purposes to show the pre-weld areas 352 and the main welds 354, the shapes of the pre-weld areas 352 and the main welds 354 need not be circular.

In FIG. 6A, the pre-weld area 356 that contains the point that is farthest from the tab edge 300 is denoted as $P_{max}$. A length of the pre-weld area 356 is denoted as length ($P_{max}$) shown at 359. A minimum distance between the tab edge 300 and the pre-weld area 356 is denoted as minimum distance ($P_{max}$, tab edge) shown at 358. From these dimensions, the first method 350 determines the pre-weld dimension 312 as follows.

In FIG. 6B, at 360, the first method 350 uses image segmentation (described above with reference to FIG. 3) to find the tab edge 300 and the pre-weld region 302 of the battery cell 100. At 362, the first method 350 finds a pre-weld area $P_{max}$ that contains the point that is farthest from the tab edge 300. At 364, the first method 350 determines the pre-weld dimension 312 as follows: Pre-weld dimension=minimum distance ($P_{max}$, tab edge)+length ($P_{max}$).

In FIGS. 6C and 6D, the second method 370 determines the pre-weld dimension 312 as follows. At 372, the second method 370 uses image segmentation (described above with reference to FIG. 3) to find the tab edge 300 and the pre-weld region 302 of the battery cell 100. At 374, the second method 370 encapsulates or isolates the pre-weld areas 352 in the pre-weld region 302 as shown by a generally rectangular dotted bounding box 390 in FIG. 6C. At 376, the second method 370 performs a line fit on the tab edge 300 and orients a measurement line 392 perpendicular to the fit line (i.e., perpendicular to the tab edge 300).

At 378, the second method 370 moves the measurement line 392 across the tab edge 300 and across the isolated pre-weld region 302 in the dotted bounding box 390. Essentially, the measurement line 392 raster scans the tab edge 300 and the isolated pre-weld region 302 in the dotted bounding box 390. While scanning the tab edge 300 and the dotted bounding box 390, the second method 370 tracks the points at which the measurement line 392 intersects the tab edge 300 and the sides of the dotted bounding box 390 that are generally parallel to the tab edge 300. Examples of these points of the intersections between the measurement line 392 and each of the tab edge 300 and the sides of the dotted bounding box 390 are shown at 394, 396, and 398, respectively.

At 380, the second method 370 uses pixel-distance calibration to determine a distribution of maximum and minimum separation between the tab edge 300 and the sides of the dotted bounding box 390. The distribution of minimum separation are measurements taken between the tab edge 300 and the pre-weld region edge 302 closest to the tab edge 300. The distribution of maximum separation are measurements taken between the tab edge 300 and the pre-weld edge 304 (shown in FIG. 5), which is the edge of the pre-weld region 302 that is farthest from the tab edge 300. The maximum separation distribution is a set of measurements that represent the pre-weld dimension 312.

In addition, the method 200 can train the classifier to detect and identify many other features of the welds from the X-ray radiographic images. For example, these features include but are not limited to features that can result from tab sticking after welding, high density features that can result from spatter, low density features that can result from foil detachment or porosity, which can be respectively detected and identified from the perimeter and center of the welds.

Sub-Steps of Method

Figure 7:
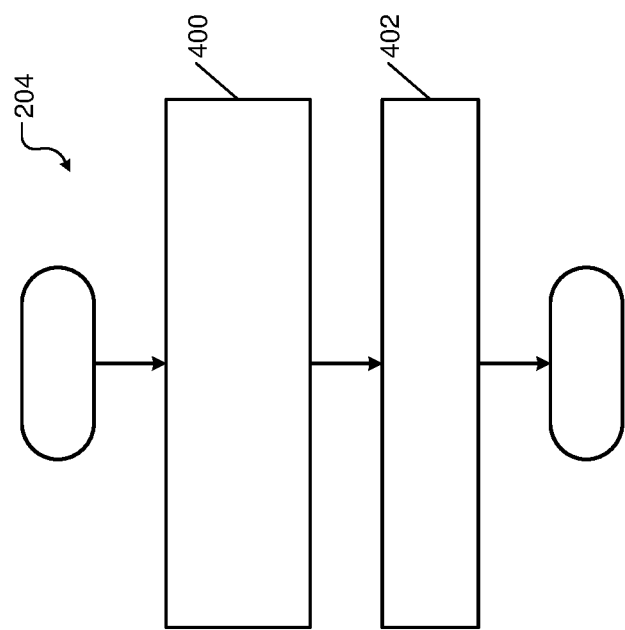

FIG. 7 shows sub-steps of the step 204 of the method 200 shown in FIG. 3. At 400, the method 200 identifies features such as tears and folds in the foils, pre-weld region (i.e., weld region of the foils), main weld region, and high- and low-density weld areas of the tabs in the X-ray radiographic images. At 402, the method 200 labels the identified features for segmenting the X-ray radiographic images (e.g., using masking shown and described above with reference to FIGS. 4B and 4C).

Figure 8:
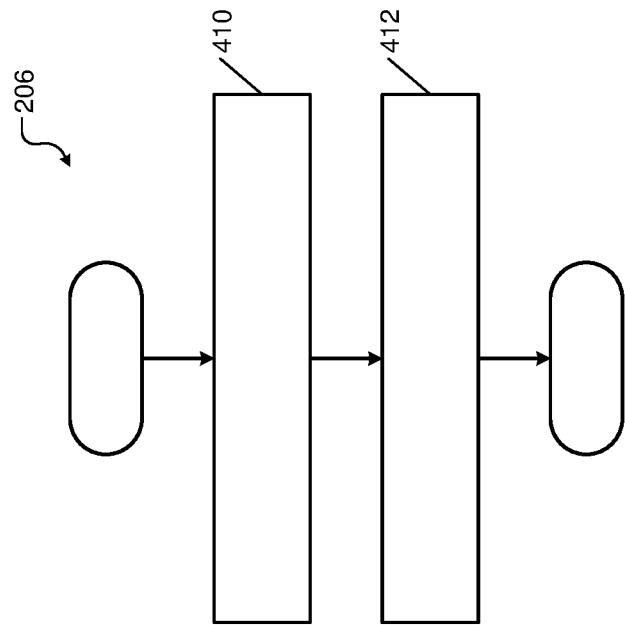
FIGS. 7-11 show sub-steps of some of the steps the method of FIG. 3.

FIG. 8 shows sub-steps of the step 206 of the method 200 shown in FIG. 3. At 410, the method 200 resizes regions of interest (e.g., scales features to minimize artifacts) from the X-ray radiographic images. The resizing is described above in detail with reference to FIG. 3 and is therefore not described again for brevity. At 412, the method 200 applies X-Ray-specific augmentation (e.g., image flipping, image rotation, etc.) to the X-ray radiographic images while avoiding contrast changes, noise, blurring etc. The X-Ray-specific augmentation is described above in detail with reference to FIG. 3 and is therefore not described again for brevity.

Figure 9:
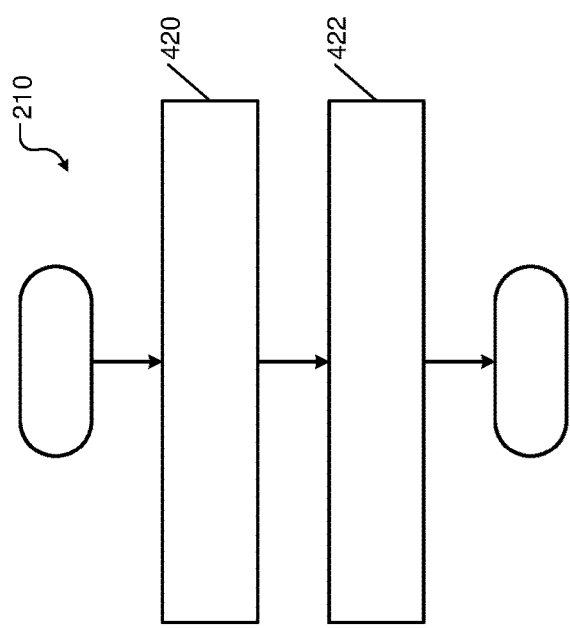

FIG. 9 shows sub-steps of the step 210 of the method 200 shown in FIG. 3. At 420, the method 200 selects X-ray radiographic images without faults (i.e., X-ray radiographic images that do not contain faults such as tears, folds, and welding faults). At 422, the method 200 trains a unary classifier to detect an unexpected feature. Additional unary classifiers can be trained to detect additional individual unexpected features. Examples of the unary classifiers and the unexpected features are described above in detail with reference to FIG. 3, and the description is therefore not repeated for brevity.

Figure 10:
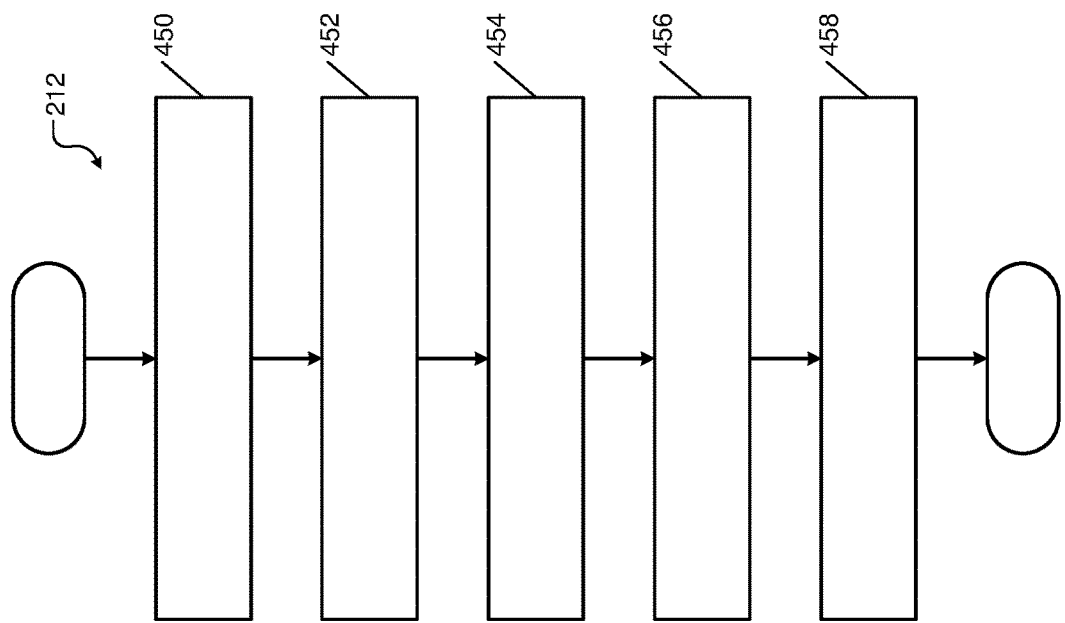

FIG. 10 shows sub-steps of the step 212 of the method 200 shown in FIG. 3. In step 212, the method 200 shown in FIG. 3 tests the battery cells 100 by processing X-ray radiographic images of the battery cells 100 received from the X-Ray radiograph-based system 150 shown in FIG. 2 using the trained classifier. In use (i.e., during run time), the step 212 of the method 200 is performed by one or more processors of the server 158 as follows.

At 450, the method 200 receives new X-ray radiographic images of the battery cells 100 from detector 156. At 452, the method 200 processes a received image to generate a processed image as described above with reference to FIG. 8.

At 454, the method 200 inputs the processed image to the trained classifier. At 456, the trained deep learning classifier performs image segmentation, feature detection and measurements, and feature labeling as described above with reference to FIGS. 3 and 5-6D. For example, the trained deep learning classifier performs image segmentation to mask the processed image for further analysis using traditional machine vision or other methods. At 458, based on the feature measurements and optionally using the masking operations described above with reference to FIGS. 4A-4C, the trained classifier detects good and faulty features and detects potentially failing features in the processed image. For example, when the hybrid approach using both deep learning image segmentation and traditional vision-based methods is used, the labels can be used to mask one or more features detected in the processed images to further apply traditional vision-based methods for additional analysis of some of the features. The trained deep learning classifier outputs data including good and faulty features and including potentially failing features detected in the processed image.

Figure 11:
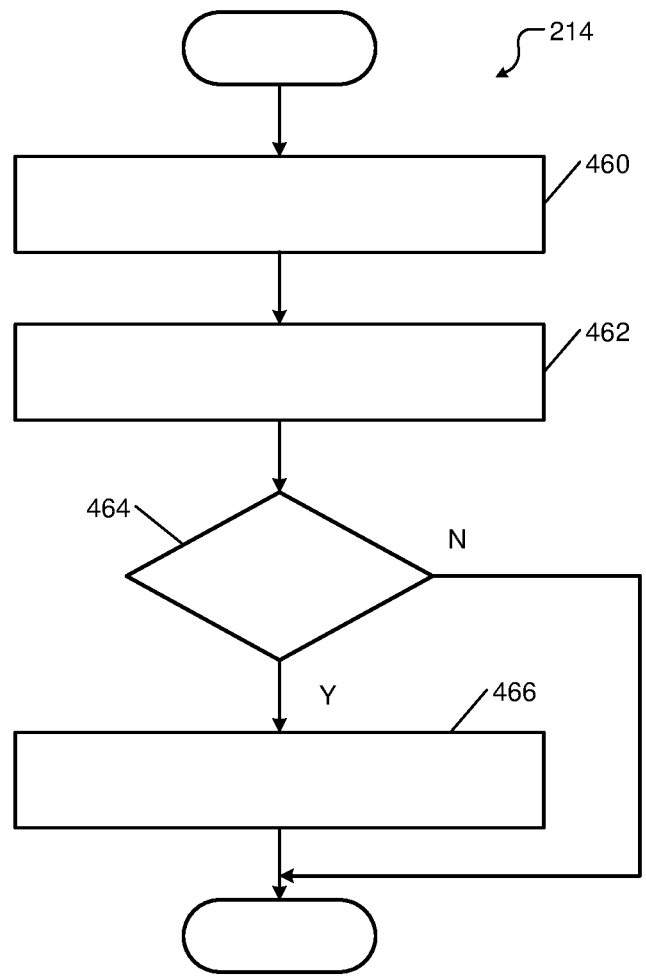

FIG. 11 shows sub-steps of the step 214 of the method 200 shown in FIG. 3. In step 214, the method 200 shown in FIG. 3 further tests the battery cells 100 by processing X-ray radiographic images of the battery cells 100 received from the X-Ray radiograph-based system 150 shown in FIG. 2 using the trained unary classifier. In use (i.e., during run time), the step 214 of the method 200 is performed by one or more processors of the server 158 as follows.

At 460, the method 200 receives new X-ray radiographic images from detector 156. At 462, the method 200 detects an unexpected feature in a selected X-ray radiographic image using one of the trained unary classifiers that is trained to detect the unexpected feature.

At 464, the method 200 determines if the unexpected feature is detected in the selected X-ray radiographic image. If not, the method 200 ends. If yes, at 466, the method 200 outputs data about the detected unexpected feature. While not shown, the method 200 can use additional trained unary classifiers to detect additional unexpected features by repeating the sub-steps of the step 214.

Server

Figure 12:
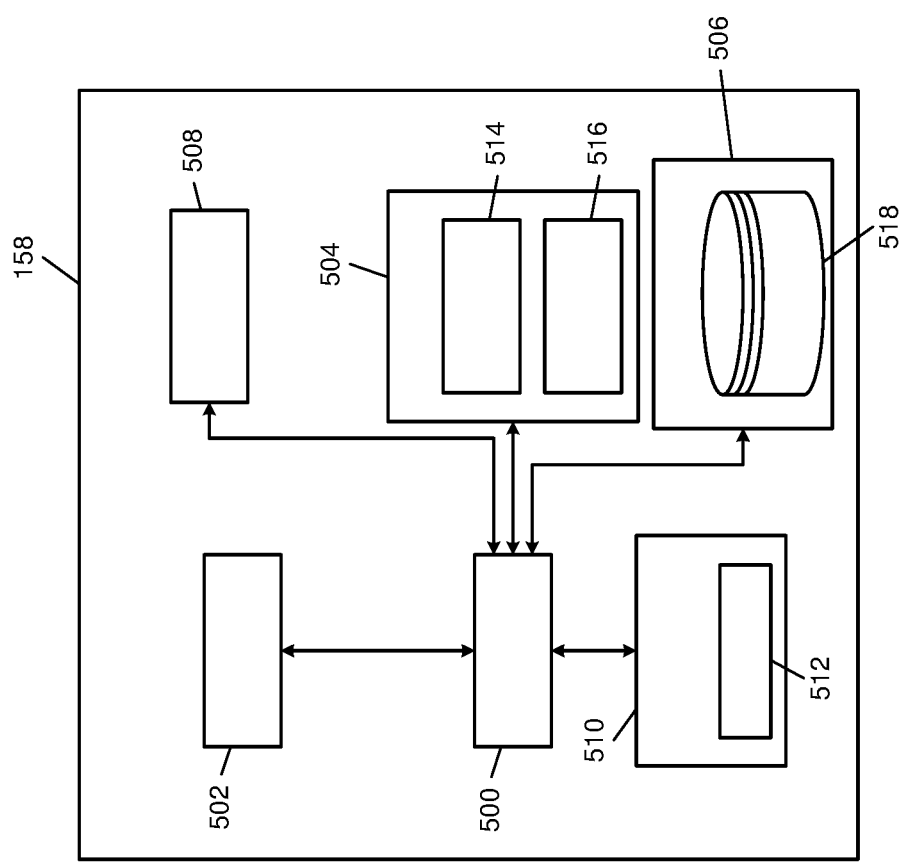
FIG. 12 shows a functional block diagram of a server used in the X-Ray radiograph-based system of FIGS. 2A-2C.

FIG. 12 shows a simplified example of the server 158. The server 158 typically includes one or more CPUs/GPUs/TPUs or processors 500, a network interface 502, memory 504, and bulk storage 506. In some implementations, the server 158 may be a general-purpose server and may include one or more input devices 508 (e.g., a keypad, touchpad, mouse, etc.) and a display subsystem 510 including a display 512.

The network interface 502 connects the server 158 to the X-Ray radiograph-based system 150 (i.e., to the X-Ray source 154 and the detector 156). For example, the network interface 502 may include a wired interface (e.g., an Ethernet or EtherCAT interface) and/or a wireless interface (e.g., a Wi-Fi, Bluetooth, near field communication (NFC), or another wireless interface). The memory 504 may include volatile or nonvolatile memory, cache, or other type of memory. The bulk storage 506 may include flash memory, one or more magnetic hard disk drives (HDDs), or other bulk storage devices.

The processor 500 of the server 158 executes one or more operating system (OS) 514 and one or more server applications 516, which may be housed in a virtual machine hypervisor or containerized architecture with shared memory. The bulk storage 506 may store one or more databases 518 that store data structures used by the server applications 516 to perform respective functions. The server applications 516 may include applications that control the X-Ray source 154 and that process the data captured by the detector 156 as described above with reference to FIGS. 2-11. Specifically, the server applications 516 execute the methods described above with reference to FIGS. 2-11.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. For example, the methods and steps thereof described herein can be tailored to suit a particular application (e.g., depending on the type of battery cells, manufacturing methods and materials used to manufacture the battery cells, etc.).

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between controllers, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "controller" may be replaced with the term "circuit." The term "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The controller may include one or more interface circuits. In some examples, the interface circuits may include wired or wireless interfaces that are connected to a local area network (LAN), the Internet, a wide area network (WAN), or combinations thereof. The functionality of any given controller of the present disclosure may be distributed among multiple controllers that are connected via interface circuits. For example, multiple controllers may allow load balancing. In a further example, a server (also known as remote, or cloud) controller may accomplish some functionality on behalf of a client controller.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more controllers. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple controllers. The term group memory circuit encompasses a memory circuit that, in combination with additional memories, stores some or all code from one or more controllers.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python@.

What is claimed is:

1. A method for detecting defects in battery cells, the method comprising:
   receiving an X-Ray radiographic image of a battery cell;
   segmenting the X-Ray radiographic image into regions of interest using a classifier;
   processing the segmented X-Ray radiographic image using the classifier to identify features of the battery cell;
   detecting whether one or more of the features in the processed X-Ray radiographic image is defective by using the classifier; and
   determining, using the classifier, whether the battery cell is defective based on whether one or more of the features in the processed X-Ray radiographic image is defective.

2. The method of claim 1, further comprises detecting an extraordinary condition in the battery cell using a unary classifier that is different than the classifier.

3. The method of claim 1, wherein the detecting comprises detecting one or more of a tear in a foil of an anode or a cathode in the battery cell, a fold in the foil, a defect in a first weld region comprising welded foils of anodes or cathodes of the battery cell, and a defect in a second weld region comprising the welded foils welded to a tab of the battery cell.

4. The method of claim 1, wherein the one or more of the features indicate one or more of a quality of welding of foils of anodes or cathodes of the battery cell and a quality of welding of the welded foils to a tab of the battery cell.

5. The method of claim 1, wherein the segmenting the X-Ray radiographic image comprises:
   highlighting the regions of interest in the X-Ray radiographic image,
   separating the regions of interest from each other, and
   labeling the regions of interest.

6. The method of claim 1, further comprises using the segmenting to mask a selected one of the features for further processing.

7. The method of claim 1, further comprises using the segmenting to mask one of the features to facilitate the processing of another one of the features.

8. The method of claim 1, further comprises training the classifier by selectively augmenting one or more of the regions of interest without causing an artifact in the X-Ray radiographic image, wherein the augmenting comprises one or more of flipping, translating, and rotating the X-Ray radiographic image or a portion thereof.

9. The method of claim 1, wherein the detecting whether one or more of the features is defective comprises:
   detecting, in the X-Ray radiographic image, an edge of a tab of the battery cell to which foils of anodes or cathodes of the battery cell are welded;
   measuring, relative to the edge of the tab, dimensions of a first weld region comprising the welded foils and a second weld region comprising the welded foils welded to the tab of the battery cell; and
   comparing the dimensions to respective thresholds.

10. The method of claim 1, wherein the detecting whether one or more of the features is defective comprises:
    detecting, in the X-Ray radiographic image, an edge of a tab of the battery cell to which foils of anodes or cathodes of the battery cell are welded;
    fitting a line perpendicular to the edge of the tab;
    encapsulating a region of the welded foils between the edge and an end of the tab in a bounding box;
    scanning the line across the edge and the bounding box;
    measuring intersections of the line with the edge and two sides of the bounding box that are relatively parallel to the edge; and
    determining whether the welding of the foils is defective based on the measurements.

11. The method of claim 8, wherein the augmenting excludes contrast changes, adding noise, and blurring the X-Ray radiographic image or a portion thereof or any augmentation that obstructs features making it difficult to identify defects.

12. A system comprising:
    an X-Ray source configured to irradiate a portion of a battery cell, the portion of the battery cell comprising portions of foils of anodes or cathodes of the battery cell and a tab of the battery cell to which the foils are welded;
    a detector configured to record an X-Ray radiographic image of the portion of the battery cell generated by irradiating the portion of the battery cell; and
    a computing device coupled to the detector, wherein the computing device is configured to:
    receive the X-Ray radiographic image of the battery cell;
    segment the X-Ray radiographic image into regions of interest using a classifier;
    process the segmented X-Ray radiographic image using the classifier to identify features of the battery cell;
    detect whether one or more of the features in the processed X-Ray radiographic image is defective by using the classifier; and
    determine, using the classifier, whether the battery cell is defective based on whether one or more of the features in the processed X-Ray radiographic image is defective.

13. The system of claim 12, wherein the computing device is configured to detect an extraordinary condition in the battery cell using a unary classifier that is different than the classifier.

14. The system of claim 12, wherein the computing device is configured to detect one or more of a tear in a foil of an anode or a cathode in the battery cell, a fold in the foil, a defect in a first weld region comprising welded foils of anodes or cathodes of the battery cell, and a defect in a second weld region comprising the welded foils welded to a tab of the battery cell.

15. The system of claim 12, wherein the one or more of the features indicate one or more of a quality of welding of foils of anodes or cathodes of the battery cell and a quality of welding of the welded foils to a tab of the battery cell.

16. The system of claim 12, wherein the computing device is configured to segment the X-Ray radiographic image by highlighting the regions of interest in the X-Ray radiographic image, separating the regions of interest from each other, and labeling the regions of interest.

17. The system of claim 12, wherein the computing device is configured to use the segmentation to mask a selected one of the features to further segment the selected one of the features for further processing and to facilitate the processing of another one of the features.

18. The system of claim 12, wherein the computing device is configured to train the classifier by selectively augmenting one or more of the regions of interest by one or more of flipping, translating, and rotating the X-Ray radiographic image or a portion thereof without causing an artifact in the X-Ray radiographic image, and wherein the augmenting excludes contrast changes, adding noise, and blurring the X-Ray radiographic image or a portion thereof.

19. The system of claim 12, wherein the computing device is configured to detect whether one or more of the features is defective by:
   detecting, in the X-Ray radiographic image, an edge of a tab of the battery cell to which foils of anodes or cathodes of the battery cell are welded;
   measuring, relative to the edge of the tab, dimensions of a first weld region comprising the welded foils and a second weld region comprising the welded foils welded to the tab of the battery cell; and
   comparing the dimensions to respective thresholds.

20. The system of claim 12, wherein the computing device is configured to detect whether one or more of the features is defective by:
   detecting, in the X-Ray radiographic image, an edge of a tab of the battery cell to which foils of anodes or cathodes of the battery cell are welded;
   fitting a line perpendicular to the edge of the tab;
   encapsulating a region of the welded foils between the edge and an end of the tab in a bounding box;
   scanning the line across the edge and the bounding box;
   measuring intersections of the line with the edge and two sides of the bounding box that are relatively parallel to the edge; and
   determining whether the welding of the foils is defective based on the measurements.

* * * * *